United States Patent [19]
Yonezawa et al.

[11] Patent Number: 5,924,959
[45] Date of Patent: Jul. 20, 1999

[54] DEVICE FOR CONTROLLING AN AUTOMATIC TRANSMISSION AND AN ENGINE FOR VEHICLES

[75] Inventors: Shiro Yonezawa; Satoshi Wachi; Hirofumi Ohuchi, all of Tokyo; Tatsuhiko Takahashi, Hyogo, all of Japan

[73] Assignee: Mitsubishi Denki Kabushiki Kaisha, Tokyo, Japan

[21] Appl. No.: 09/037,059

[22] Filed: Mar. 9, 1998

[30] Foreign Application Priority Data

Nov. 21, 1997 [JP] Japan .................................... 9-321286

[51] Int. Cl.⁶ .................................................. B60K 41/02
[52] U.S. Cl. .............................. 477/181; 477/54; 477/62; 477/83; 477/168; 477/905
[58] Field of Search ............................... 477/54, 62, 168, 477/181, 905, 63, 83, 174; 701/54

[56] References Cited

U.S. PATENT DOCUMENTS

| | | | |
|---|---|---|---|
| 4,456,107 | 6/1984 | Ito et al. | 477/62 X |
| 4,766,544 | 8/1988 | Kurihara et al. | 477/181 X |
| 5,086,894 | 2/1992 | Iizuka et al. | 477/174 X |
| 5,141,089 | 8/1992 | Nobumoto et al. | 477/181 X |
| 5,374,224 | 12/1994 | Huffmaster et al. | 477/181 |
| 5,378,211 | 1/1995 | Slicker et al. | 477/181 X |
| 5,803,868 | 9/1998 | Kono et al. | 477/168 |

FOREIGN PATENT DOCUMENTS 5-262169  10/1993  Japan .
9-151755   6/1997  Japan .

*Primary Examiner*—Charles A Marmor
*Assistant Examiner*—Sherry Lynn Estremsky
*Attorney, Agent, or Firm*—Sughrue, Mion, Zinn, Macpeak & Seas, PLLC

[57] ABSTRACT

A device for controlling an automatic transmission and an engine for vehicles expanding a range of direct drive to improve fuel efficiency and decreasing the shock due to the transmission of torque at the time of acceleration or deceleration. The device comprises a torque converter 3 for transmitting the output torque of an engine 1, a direct drive mechanism 4 for directly coupling an output shaft 3a of the torque converter to an output shaft 1a of said engine, a control 6A for controlling an automatic transmission 2 that includes the torque converter and the direct drive mechanism, a sensor 8 for detecting the opening degree A of an accelerator 7, a throttle valve 9 for adjusting the amount of the air intaken by the engine, an actuator 10 for opening or closing the throttle valve, and a throttle valve control for controlling the throttle valve opening degree T, wherein the automatic transmission control resets the directly coupled state when the accelerator pedal opening degree has changed by more than a predetermined amount that corresponds to a transient operation condition, and the throttle valve control delays the operation for opening the throttle valve following the accelerator pedal opening degree when the accelerator pedal opening degree has changed by more than the predetermined amount.

10 Claims, 5 Drawing Sheets

DEVICE FOR CONTROLLING AN AUTOMATIC TRANSMISSION AND AN ENGINE FOR VEHICLES

BACKGROUND OF THE INVENTION

1. Field of the Invention

The present invention relates to a device for controlling an automatic transmission and an engine for vehicles by using a fluid clutch and a direct drive mechanism. More particularly, the invention relates to a device for controlling an automatic transmission and an engine for vehicles capable of improving drivability by suppressing shocks at the time of acceleration or deceleration.

2. Prior Art

There has heretofore been known a device for controlling an automatic transmission and an engine for vehicles in which the output torque of an engine is transmitted to the wheels via a torque converter made up of a fluid clutch as disclosed in, for example, Japanese Unexamined Patent Publication (Kokai) No. 262169/1993.

FIG. 5 is a diagram schematically illustrating the constitution of major portions of a conventional device for controlling an automatic transmission and an engine for vehicles.

In FIG. 5, an output shaft $1a$ of an engine 1 mounted on a vehicle is directly coupled to an automatic transmission 2, and the output torque of the engine 1 is transmitted to the wheels (not shown) via the automatic transmission 2.

The automatic transmission 2 includes a torque converter 3 for transmitting the output torque of the engine 1 to the wheels via a fluid, and a direct drive mechanism 4 for directly coupling an output shaft $3a$ of the torque converter 3 to the output shaft $1a$ of the engine.

The output torque of the torque converter 3 is transmitted to the wheels via speed-change gears (not shown) in the automatic transmission 2.

The direct drive mechanism 4 is controlled by a direct drive torque control means 5. In a direct drive mode in a steady operation condition, the direct drive control duty D decreases and the fluid on the side of the engine 1 is drained, so that the output shaft $3a$ of the torque converter 3 is directly coupled to the output shaft $1a$ of the engine.

An automatic transmission control means 6 constituted by a microcomputer fetches operation condition data from a variety of sensors (not shown), controls the direct drive mechanism 4 through the direct drive torque control means 5 and, further, controls the automatic transmission 2.

The operation of the conventional device for controlling the automatic transmission and the engine for vehicles will now be described with reference to FIG. 5.

When the direct drive mechanism 4 is not working, the torque converter 3 in the automatic transmission 2 transmits the output torque of the engine 1 to the side of the speed-change gears via the fluid, i.e., ATF (AT fluid) filled therein.

The torque converter 3 having a torque amplification function works to increase the drive torque to become greater than the output torque of the engine 1.

Besides, since the output torque of the engine 1 is transmitted to the speed-change gears via the fluid in the automatic transmission 2, a sudden change in the output torque of the engine 1 is absorbed by the fluid; i.e., the input torque to the speed-change gears does not suddenly change, and a shock is avoided.

The torque converter 3 having the above-mentioned advantage also involves a problem as described below.

That is, since the output torque is transmitted via the fluid, heat is generated resulting in an increased transmission loss of energy and an increased fuel consumption.

In order to improve fuel efficiency of the vehicles, therefore, it is accepted practice to provide the automatic transmission 2 with the direct drive mechanism 4 so that, in the steady operation condition, the output shaft $1a$ of the engine 1 is directly coupled to the output shaft $3a$ of the torque converter 3 through the direct drive torque control means 5 and that the output torque of the engine 1 is directly transmitted to the side of the speed-change gears. This helps improve the efficiency for transmitting the output torque of the engine 1 and improve the fuel efficiency of vehicles.

In recent years, furthermore, it is a tendency to widen the region for operating the direct drive mechanism 4 as much as possible in an effort to improve the fuel efficiency.

However, when the output torque of the engine 1 suddenly changes at the time of acceleration or deceleration due to the accelerator pedal work, a change in the torque of the engine 1 is directly transmitted from the automatic transmission 2 to the drive axle of the wheels since the direct drive mechanism 4 is directly coupled, giving rise to the occurrence of a shock due to acceleration or deceleration.

When the directly coupled state is maintained during the acceleration, furthermore, the torque converter 3 does not work to amplify the torque; i.e., the drive torque for the wheels is not sufficient and the acceleration becomes poor.

Moreover, despite it is attempted to reset the directly coupled state of the direct drive mechanism 4 at the time when the accelerator pedal is depressed, a delay of transmission occurs through the fluid pressure (hydraulic) passage, and the directly coupled state is not readily reset.

In this case, the output torque of the engine 1 changes due to the depression of the accelerator pedal before the directly coupled state is really reset, and the above-mentioned inconvenience occurs.

In the region where the above-mentioned inconvenience occurs, therefore, it is not allowed to widen a range in which the direct drive mechanism 4 works.

In the conventional device for controlling the automatic transmission and the engine for vehicles as described above, it is not allowed to properly control the direct drive mechanism 4 in the automatic transmission 2. Therefore, the function for amplifying the torque of the torque converter 3 is not exhibited when the direct drive mechanism 4 maintains the directly coupled state at the time of acceleration, arousing a problem in that the drive torque is not sufficient and the acceleration is poor.

Besides, no means is provided for compensating a delay in the operation of the direct drive mechanism 4. Accordingly, despite the direct drive mechanism 4 is reset in response to the operation for depressing the accelerator pedal, the directly coupled state is not readily reset due to a delay in the transmission through the fluid pressure passage. Consequently, the output torque of the engine 1 changes due to the depression of the accelerator pedal before the directly coupled state is reset making it, after all, difficult to suppress the shock caused by a change in the torque during the transient operation condition.

Besides, due to the above-mentioned inconvenience, it is not allowed to operate the direct drive mechanism 4 within the range where the inconvenience occurs; i.e., it is not allowed to widen the range of direct drive though this sacrifices the object for improving the fuel efficiency.

SUMMARY OF THE INVENTION

The present invention was accomplished in order to solve the above-mentioned problems, and its object is to provide a device for controlling an automatic transmission and an engine for vehicles, capable of reducing the shock of torque transmission that occurs in the directly coupled state at the time of acceleration or deceleration, improving the lack of drive force at the time of acceleration, and improving the fuel efficiency by widening the range of direct coupling.

According to the present invention, a device for controlling an automatic transmission and an engine for vehicles, comprises:

an engine mounted on a vehicle;

a torque converter for transmitting the output torque of said engine to the side of the wheels via a fluid;

a direct drive mechanism for directly coupling the output shaft of said torque converter to the output shaft of said engine;

an automatic transmission including said torque converter and said direct drive mechanism;

an automatic transmission control means for controlling said automatic transmission;

an accelerator pedal operated by a driver of said vehicle;

an accelerator pedal opening-degree sensor for detecting the amount of depression of said accelerator pedal as an accelerator pedal opening degree;

a throttle valve for adjusting the amount of the air intaken by said engine;

a throttle actuator for opening and closing said throttle valve; and a throttle valve control means for controlling the throttle valve opening degree by driving said throttle actuator; wherein said automatic transmission control means resets the directly coupled state of said direct drive mechanism when the accelerator pedal opening degree has changed by more than a predetermined amount that corresponds to a transient operation condition; and said throttle valve control means delays the operation for opening said throttle valve following the accelerator pedal opening degree when said accelerator pedal opening degree has changed by more than said predetermined amount.

In the device for controlling an automatic transmission and an engine for vehicles according to the present invention, furthermore, said throttle valve control means changes the throttle valve opening degree in response to an amount of change in the accelerator pedal opening degree after the passage of a predetermined delay time that corresponds to the operation time of said direct drive mechanism.

In the device for controlling an automatic transmission and an engine for vehicles according to the present invention, furthermore, said throttle valve control means limits a rate of change in the throttle valve opening degree to be smaller than a predetermined value.

In the device for controlling an automatic transmission and an engine for vehicles according to the present invention, furthermore, a predetermined amount corresponding to a change in the accelerator pedal opening degree in said transient operation condition, a delay time for opening said throttle valve following the accelerator pedal opening degree, and a predetermined value for limiting a rate of change in the throttle valve opening degree, are variably set depending upon the operation conditions of said vehicle at a moment when said transient operation condition is detected.

In the device for controlling an automatic transmission and an engine for vehicles according to the present invention, furthermore, said throttle valve control means changes the throttle valve opening degree in response to the amount of change in the accelerator pedal opening degree while limiting the rate of change in the throttle valve opening degree to be smaller than a predetermined value.

In the device for controlling an automatic transmission and an engine for vehicles according to the present invention, furthermore, a predetermined value for limiting the rate of change in the throttle valve opening degree following the accelerator pedal opening degree, is variably set depending upon the operation conditions of said vehicle at a moment when said transient operation condition is detected.

In the device for controlling an automatic transmission and an engine for vehicles according to the present invention, furthermore, said automatic transmission control means permits said direct drive mechanism to return to the directly coupled state at a moment when the amount of change in the throttle valve opening degree has become smaller than a permissible amount.

In the device for controlling an automatic transmission and an engine for vehicles according to the present invention, furthermore, said automatic transmission control means permits said direct drive mechanism to return to the directly coupled state after the passage of a predetermined margin time from when the amount of change in the throttle valve opening degree has become smaller than the permissible amount.

In the device for controlling an automatic transmission and an engine for vehicles according to the present invention, furthermore, the permissible amount of change in the throttle valve opening degree for returning to said directly coupled state and said predetermined margin time, are variably set depending upon the operation conditions of said vehicle at a moment when said directly coupled state is resumed.

In the device for controlling an automatic transmission and an engine for vehicles according to the present invention, furthermore, said automatic transmission control means permits said direct drive mechanism to return to the directly coupled state through a slip-coupled state.

DESCRIPTION OF THE PREFERRED EMBODIMENTS

Embodiment 1

Figure 1:
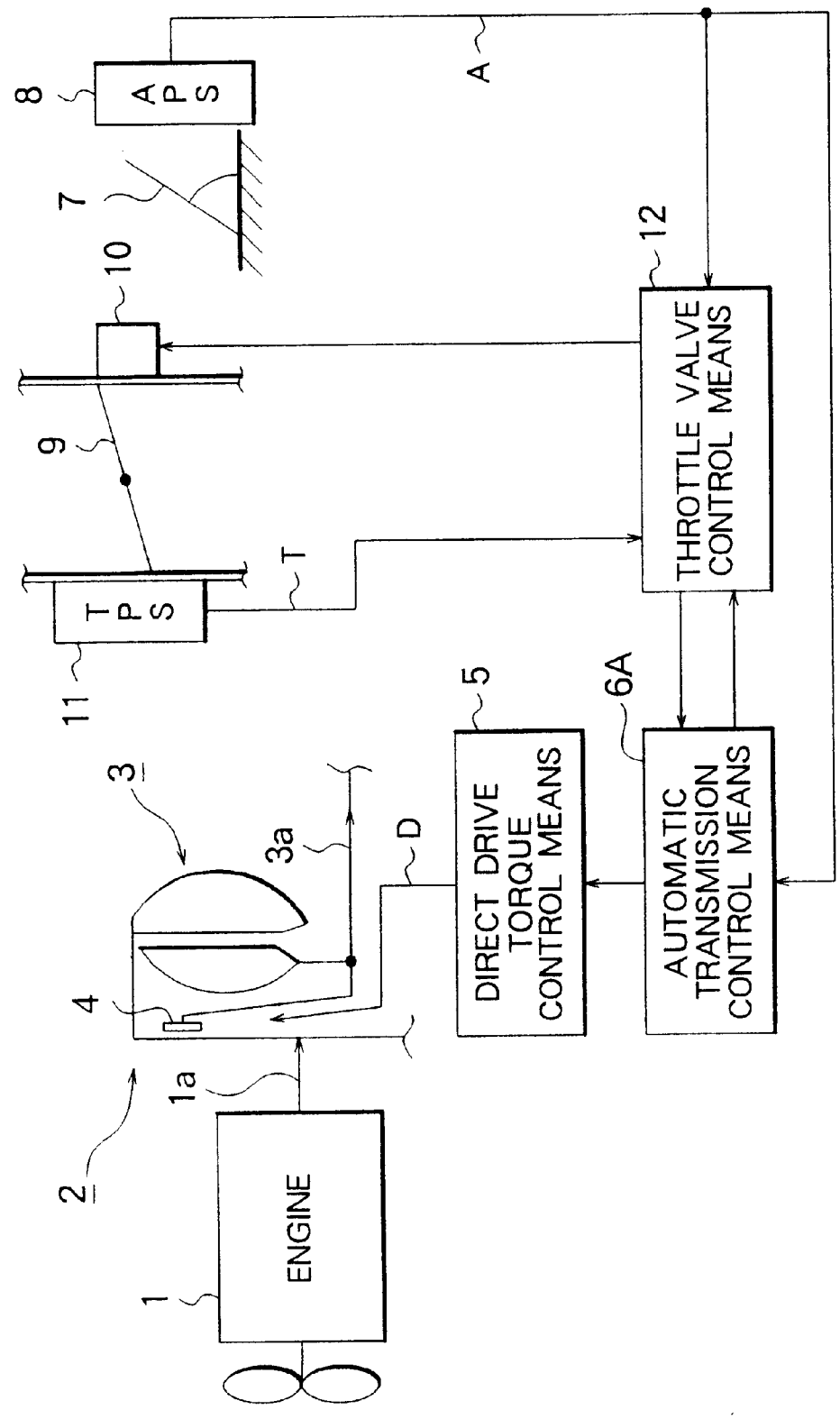
FIG. 1 is a block diagram illustrating the constitution of an embodiment 1 of the present invention.

An embodiment 1 of the present invention will now be described with reference to the drawings. FIG. 1 is a block diagram illustrating the constitution of the embodiment 1 according to the present invention and in which the same elements as those described above are denoted by the same reference numerals but their description is not repeated.

The depressed amount of an accelerator pedal 7 operated by the driver of a vehicle is detected by an accelerator pedal opening-degree sensor (hereinafter referred to as "APS") 8 as an accelerator pedal opening degree A, and is input to an automatic transmission control means 6A and to a throttle valve control means 12. A throttle valve 9 provided in the intake pipe of the engine 1 is opened or closed by a throttle actuator 10 made up of an electric motor, thereby to adjust the amount of the air intaken by the engine 1.

The open/close position of the throttle valve 9 is detected by a throttle valve opening-degree sensor (hereinafter referred to as "TPS") 11 as a throttle valve opening degree T, and is input to the throttle valve control means 12.

The throttle valve control means 12 operates the amount for controlling the throttle actuator 10 depending upon various operation conditions inclusive of the accelerator pedal opening degree A, so that the throttle valve 9 reaches a target opening degree while feeding back the throttle valve opening degree T.

In FIG. 1, when the accelerator pedal opening degree A has changed by more than a predetermined amount that corresponds to a transient operation condition, the automatic transmission control means 6A sets the direct drive control duty D of the direct drive torque control means 5 to 0% thereby to reset the directly coupled state of the direct drive mechanism 4.

Then, after the directly coupled state of the direct drive mechanism 4 is reset, the automatic transmission control means 6A permits the direct drive mechanism 4 to return to the directly coupled state at a moment when the amount of change in the throttle valve opening degree T has become smaller than a permissible amount after the throttle valve 9 is stabilized.

Here, after the passage of a predetermined margin time tm from when the amount of change in the throttle valve opening degree T has become smaller than the permissible amount, the automatic transmission control means 6A permits the direct drive mechanism to return to the directly coupled state passing through a slip-coupled state (half-clutch state).

When the accelerator pedal opening degree A has changed by more than a predetermined amount that corresponds to a transient operation condition, the throttle valve control means 12 delays the operation for opening the throttle valve following the accelerator pedal opening degree A.

That is, in response to the amount of change in the accelerator pedal opening degree A larger than a predetermined amount, the throttle valve control means 12 varies the throttle valve opening degree T after the passage of a predetermined delay time td corresponding to the operation time of the direct drive mechanism 4 while limiting the rate of change in the throttle valve opening degree to be not larger than a predetermined value α.

The predetermined amount corresponding to a change in the accelerator pedal opening degree A in the transient operation condition, the delay time td of the throttle valve opening degree T that follows the accelerator pedal opening degree A, and the predetermined value a for limiting the rate of change in the throttle valve opening degree T, are variably set depending upon the operation conditions of the vehicle at a moment when a transient operation condition is detected.

Similarly, the permissible amount of change in the throttle valve opening degree T for returning the direct drive mechanism 4 to the directly coupled state and the predetermined margin time tm, are variably set depending upon the operation conditions of the vehicle at a moment when the directly coupled state is resumed.

In the operation condition where the engine running speed Ne is low, for example, it has been known that the output torque of the engine changes greatly accompanying a change in the throttle valve opening degree T compared with that of the operation condition where the engine running speed Ne is high.

In the operation condition where the engine running speed Ne is low and where the torque varies to a large extent, therefore, it is desired that various parameters are so set that the directly coupled state can be easily reset but cannot be easily resumed.

That is, in the operation condition where the engine running speed Ne is low, the predetermined amount corresponding to a change in the accelerator pedal opening degree A in the transient operation condition is set to a small amount, the delay time td for varying the throttle valve opening degree T following the accelerator pedal opening degree A is set to be long, and the predetermined value a for limiting the rate of change in the throttle valve opening degree T is set to a small amount.

In the operation condition where the engine running speed Ne is low, furthermore, the permissible amount of change in the throttle valve opening degree T for permitting the direct drive mechanism 4 to return to the directly coupled state, is set to a value larger than that in the operation condition where the engine running speed Ne is high, and the margin time tm is set to be longer than that in the operation condition where the engine running speed Ne is high.

Next, the operation of the embodiment 1 of the invention shown in FIG. 1 will be described with reference to a timing chart of FIG. 2.

Figure 2:
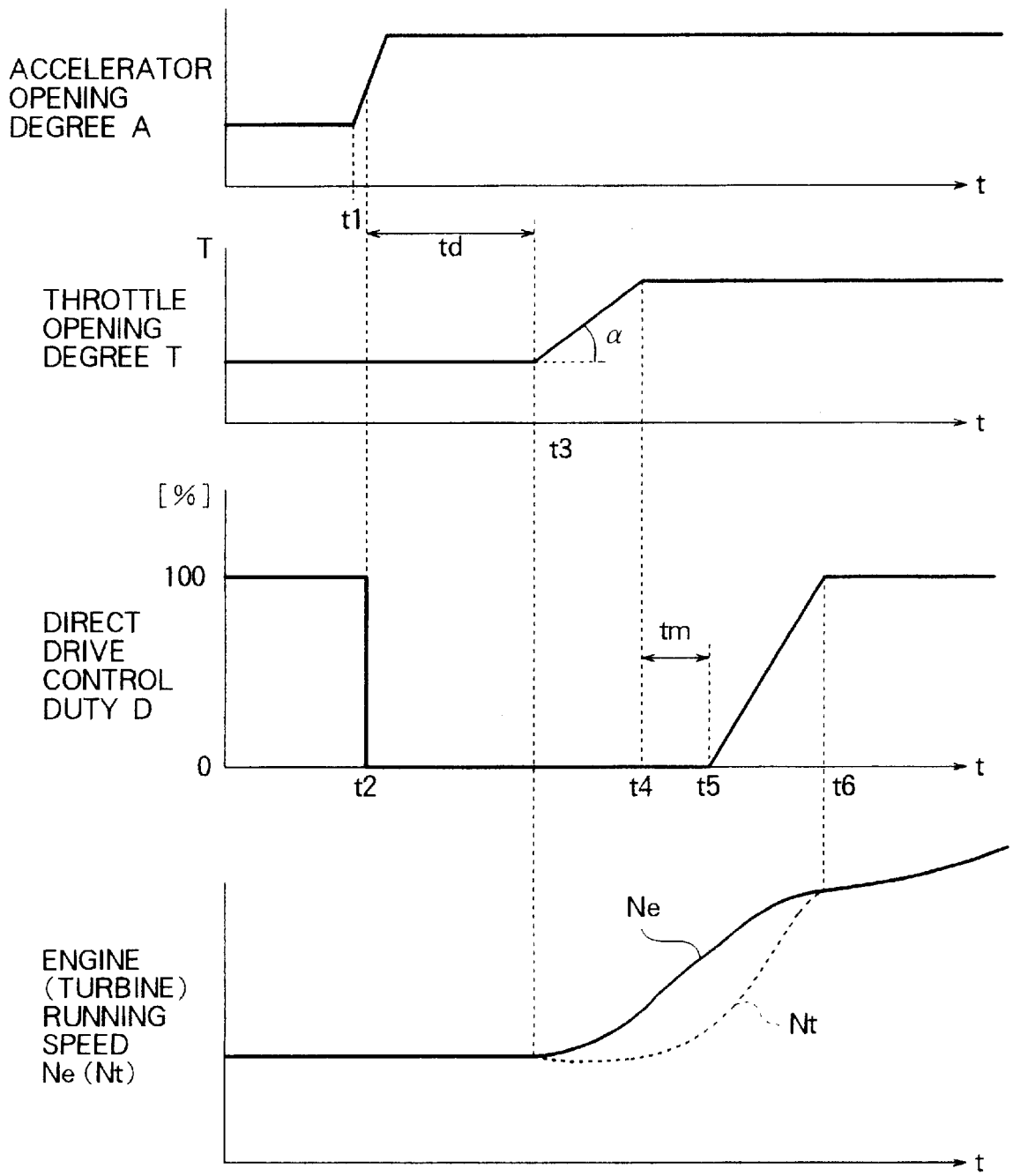
FIG. 2 is a timing chart illustrating the operation during the acceleration according to the embodiment 1 of the present invention.

FIG. 2 shows a change in the throttle valve opening degree T, a direct drive control duty D, an engine running speed Ne and a turbine running speed Nt with the passage of time when the accelerator pedal opening degree A is quickly increased (accelerated) while the direct drive mechanism 4 is in operation (in the directly coupled state).

In FIG. 2, the throttle valve opening degree T increases after the passage of a delay time td from an increase in the accelerator pedal opening degree A, and a change in the throttle valve opening degree T is so controlled as will not to exceed a predetermined value α.

The direct drive control duty D is applied as a control quantity for the direct drive mechanism 4 in the automatic transmission 2; i.e., a non-directly coupled state is established when D=0%, a directly coupled state is established when D=100%, and a slip-coupled state (half-clutch state) is established when 0%<D<100%.

The turbine running speed Nt (see a broken line) that follows the engine running speed Ne (see a solid line) varies depending upon the running speed of the output shaft of the torque converter 3 (input shaft of the transmission).

First, the engine running speed Ne is in agreement with the turbine running speed Nt when the vehicle is steadily running where the direct drive control duty D is set to 100% and the direct drive mechanism 4 in the automatic transmission 2 is in the directly coupled state.

Next, when the driver depresses the accelerator pedal 7 at a moment t1 to accelerate the vehicle, the accelerator pedal opening degree A quickly increases as detected by the APS 8.

At this moment, the throttle control means 12 is not still permitting the throttle valve opening degree T to follow the accelerator pedal opening degree A; i.e., the throttle valve opening degree T does not still change.

At a moment t2 immediately after the moment t1, the automatic transmission control means 6A detects an amount of change in the accelerator pedal opening degree A greater than a predetermined amount, and determines that the vehicle be shifted to the acceleration condition. At the moment t2, therefore, the automatic transmission control means 6A readily sets the direct drive control duty D to 0% in order to reset the directly coupled state of the direct drive mechanism 4.

From the moment t2, therefore, the fluid starts flowing into the vicinity of the direct drive mechanism 4, and the operation for resetting the directly coupled state begins.

Then, at a moment after the passage of a delay time td required for resetting the directly coupled state of the direct drive mechanism 4, the throttle control means 12 operates the throttle valve 9 to increase the throttle valve opening degree T. In this case, even in case a change in the accelerator pedal opening degree A may be great at the moment t1, a rate of change (angle of inclination) in the throttle valve opening degree T is limited to be not larger than the predetermined value $\alpha$.

Due to an increase in the throttle valve opening degree T, the output torque of the engine 1 increases starting from the moment t3 and the engine running speed Ne rises. In this case, the directly coupled state of the direct drive mechanism 4 has been reset already, and the engine running speed Ne is transmitted to the side of the transmission through the torque converter 3.

Accordingly, the turbine running speed Nt (broken line) gradually increases following an increase in the engine running speed Ne (solid line), and the vehicle starts accelerating.

Then, at a moment t5 after the passage of a predetermined margin time tm from a moment t4 when the amount of change in the throttle valve opening degree T becomes smaller than the permissible amount (at which the operation position of the throttle valve 9 is stabilized), the automatic transmission control means 6A starts permitting the direct drive mechanism 4 to return to the directly coupled state.

In this case, the automatic transmission control means 6A does not readily set the direct drive control duty D to 100% but, instead, gradually increases the direct drive control duty from 0% toward 100% through a slip-coupled state (half-clutch state).

At a moment t6 after the passage of a time corresponding to the operation time (delay time) of the direct drive mechanism 4 from the moment t5, the direct drive control duty D for the direct drive mechanism 4 becomes 100%.

That is, after the passage of a delay time from the moment t5, the fluid is completely drained from near the direct drive mechanism 4, and the directly coupled state is resumed.

The difference between the engine running speed Ne and the turbine running speed Nt gradually decreases starting from the moment t5, and becomes nearly zero at the moment t6 at which the direct drive control duty D reaches 100% and at which the operation for returning to the directly coupled state of the direct drive mechanism 4 is completed.

The control change-over operation at the time of acceleration was described above with reference to FIG. 2. The same also holds true at the time of deceleration.

Figure 3:
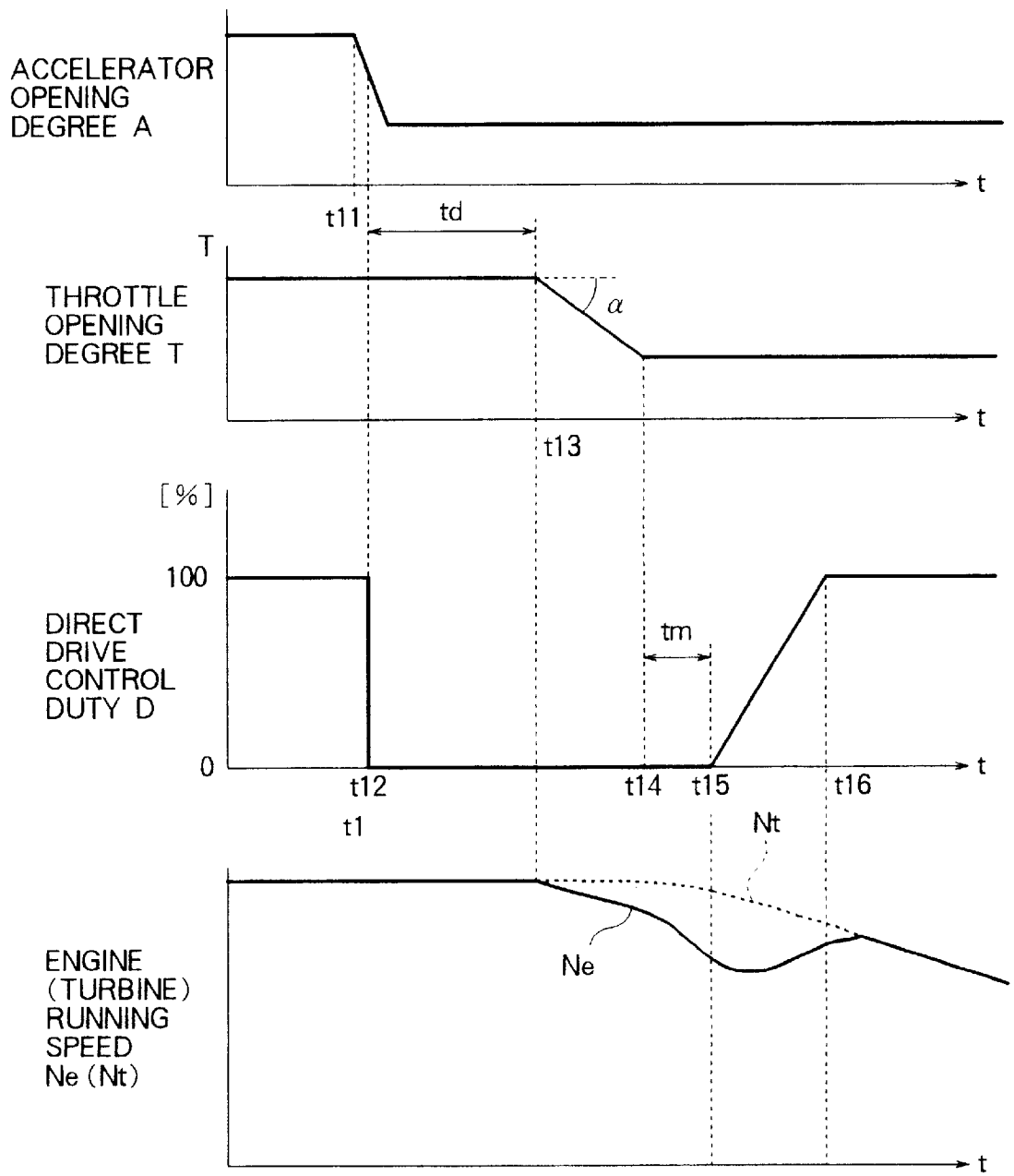
FIG. 3 is a timing chart illustrating the operation during the deceleration according to the embodiment 1 of the present invention.

FIG. 3 is a timing chart for explaining the operation at the time of deceleration. The operation is the same as the above-mentioned operation (see FIG. 2) except that the polarities of changes in the accelerator pedal opening degree A, throttle valve opening degree T, engine running speed Ne and turbine running speed Nt are inverted. Moments t11 to t16 correspond to the above-mentioned moments t1 to t6.

The operation at the time of deceleration according to the embodiment 1 of the invention will now be described with reference to FIG. 3.

First, the engine running speed Ne is in agreement with the turbine running speed Nt when the vehicle is steadily running and when the direct drive control duty D has been set to 100% (the direct drive mechanism 4 is in the directly coupled state).

Then, when the driver releases the accelerator pedal 7 at a moment t11 to decelerate the vehicle, the accelerator pedal opening degree A readily and suddenly decreases as detected by the APS 8.

At this moment, the throttle control means 12 does not permit the throttle valve opening degree T to follow the accelerator pedal opening degree A, and the throttle valve opening degree T does not still change.

At a moment t12 immediately after the moment t11, the automatic transmission control means 6A detects an amount of change in the accelerator pedal opening degree A greater than a predetermined amount, and determines that the vehicle be shifted to the deceleration condition and, hence, readily sets the direct drive control duty D to 0% in order to reset the directly coupled state.

From the moment t2, therefore, the operation starts resetting the directly coupled state. At a moment t13 after the passage of a delay time td, the throttle control means 12 operates the throttle valve 9 to decrease the throttle valve opening degree T. In this case, a rate of change (angle of inclination) in the throttle valve opening degree T is limited to be not larger than the predetermined value $\alpha$ irrespective of a change in the accelerator pedal opening degree A.

Due to a decrease in the throttle valve opening degree T, the output torque of the engine 1 decreases starting from the moment t13 and the engine running speed Ne decreases. In this case, the directly coupled state has been reset, and the engine running speed Ne is transmitted to the side of the transmission through the torque converter 3.

Accordingly, the turbine running speed Nt (broken line) gradually decreases following a decrease in the engine running speed Ne (solid line), and the vehicle starts decelerating.

Then, at a moment t15 after the passage of a predetermined margin time tm from a moment t14 at which the amount of change in the throttle valve opening degree T becomes smaller than the permissible amount, the direct drive mechanism 4 starts returning to the directly coupled state.

In this case, the direct drive control duty D gradually increases from 0% toward 100% through a slip-coupled state in the same manner as described above. At this moment, the difference between the engine running speed Ne and the turbine running speed Nt becomes nearly zero.

After the accelerator pedal 9 is depressed or released, as described above, the directly coupled state of the direct drive mechanism 4 is released at the moment t2 or t12 at which a change greater than a predetermined amount of the accelerator pedal opening degree A is detected. Then, the throttle valve opening degree T is controlled to be opened or closed starting from the moment t3 or t13 at which the operation for resetting the directly coupled state is nearly completed, in order to increase or decrease the output torque of the engine 1 and, hence, to decrease the shock at the time of acceleration or deceleration.

Besides, since the amount of change in the throttle valve opening degree T is limited not to exceed the predetermined value a from the moment t3 or t13 to the moment t4 or t14, the shock can be further decreased at the time of acceleration or deceleration.

Even in a transient operation condition (acceleration or deceleration), the directly coupled state can be readily reset without generating shock due to the transmission of torque. Accordingly, the directly coupled state is maintained nearly steadily making it possible to increase the range where the directly coupled state is maintained to save the consumption of fuel.

At the time of acceleration, furthermore, the directly coupled state is reset (non-directly coupled state is established) at an early stage of acceleration. Therefore, the effect for amplifying the torque of the torque converter 3 is utilized to accomplish good acceleration.

During the acceleration or deceleration after the directly coupled state is reset, furthermore, the direct drive mechanism 4 is permitted to return to the directly coupled state after it is confirmed that the throttle valve opening degree T is stabilized. It is therefore made possible to suppress the time region of non-directly coupled state to a minimum required limit during the acceleration or deceleration to accomplish favorable fuel efficiency again.

When returning to the directly coupled state, the direct drive control duty D is gradually shifted toward 100% passing through the slip-coupled state in order to reliably decrease the shock that occurs at the time of returning to the directly coupled state.

In response to a change in the accelerator pedal opening degree A, furthermore, the control timings of the direct drive mechanism 4 and of the throttle actuator 10 are determined depending upon various parameters which are variably set relying upon the operation conditions of the vehicle. Therefore, the control timings are optimized at all times irrespective of the operation conditions. That is, it is allowed to more reliably prevent the shock of torque transmission at the time when the output torque of the engine increases or decreases and when the directly coupled state is resumed.

Embodiment 2

In the above-mentioned embodiment 1, the delay time td was so set that the throttle valve opening degree T follows the accelerator pedal opening degree A in a delayed manner. The throttle valve opening degree T, however, may follow the accelerator pedal opening degree A while limiting a rate of change in the throttle valve opening degree T to be not larger than a predetermined value.

Figure 4:
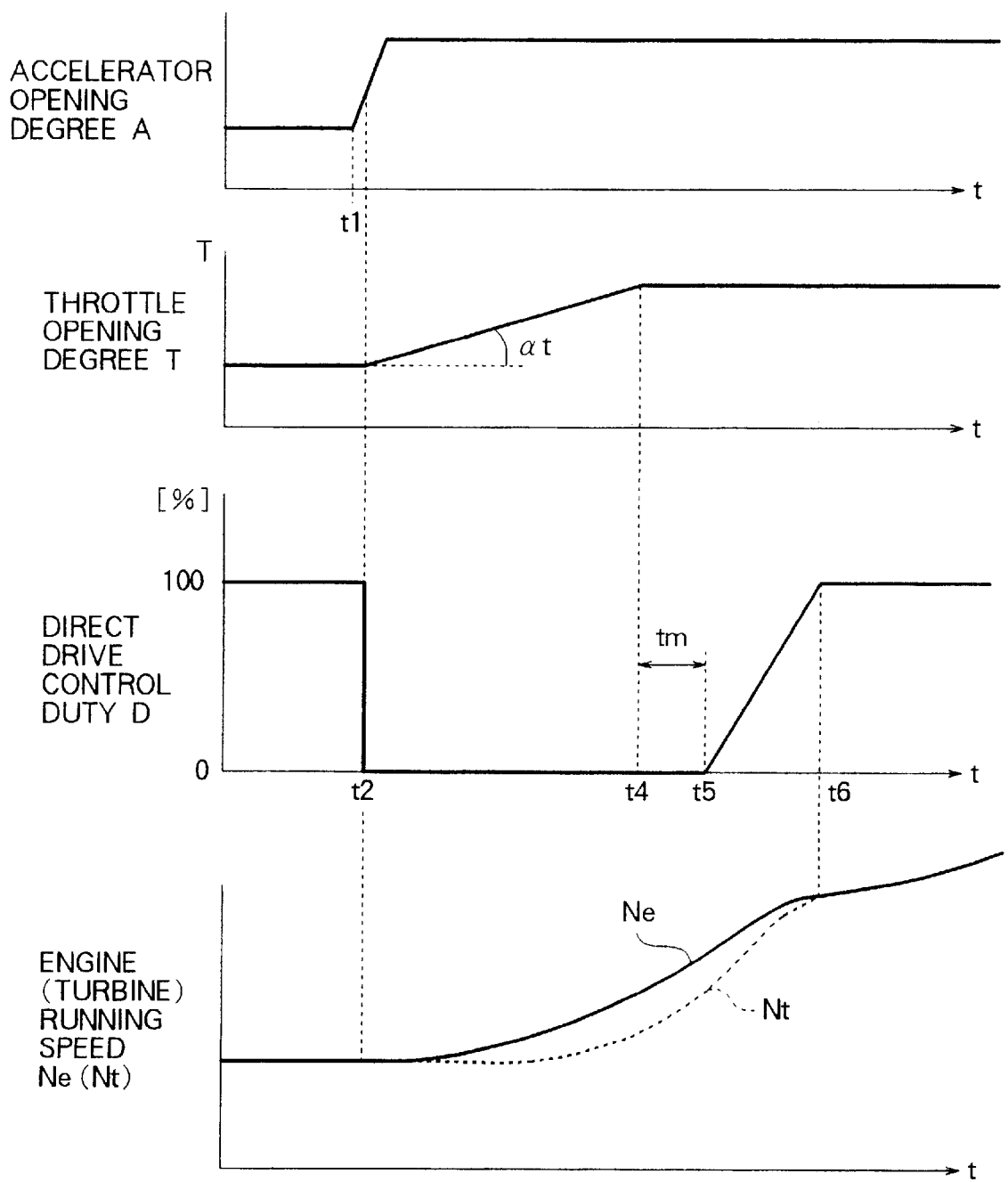
FIG. 4 is a timing chart illustrating the operation during the acceleration according to an embodiment 2 of the present invention.
Figure 5:
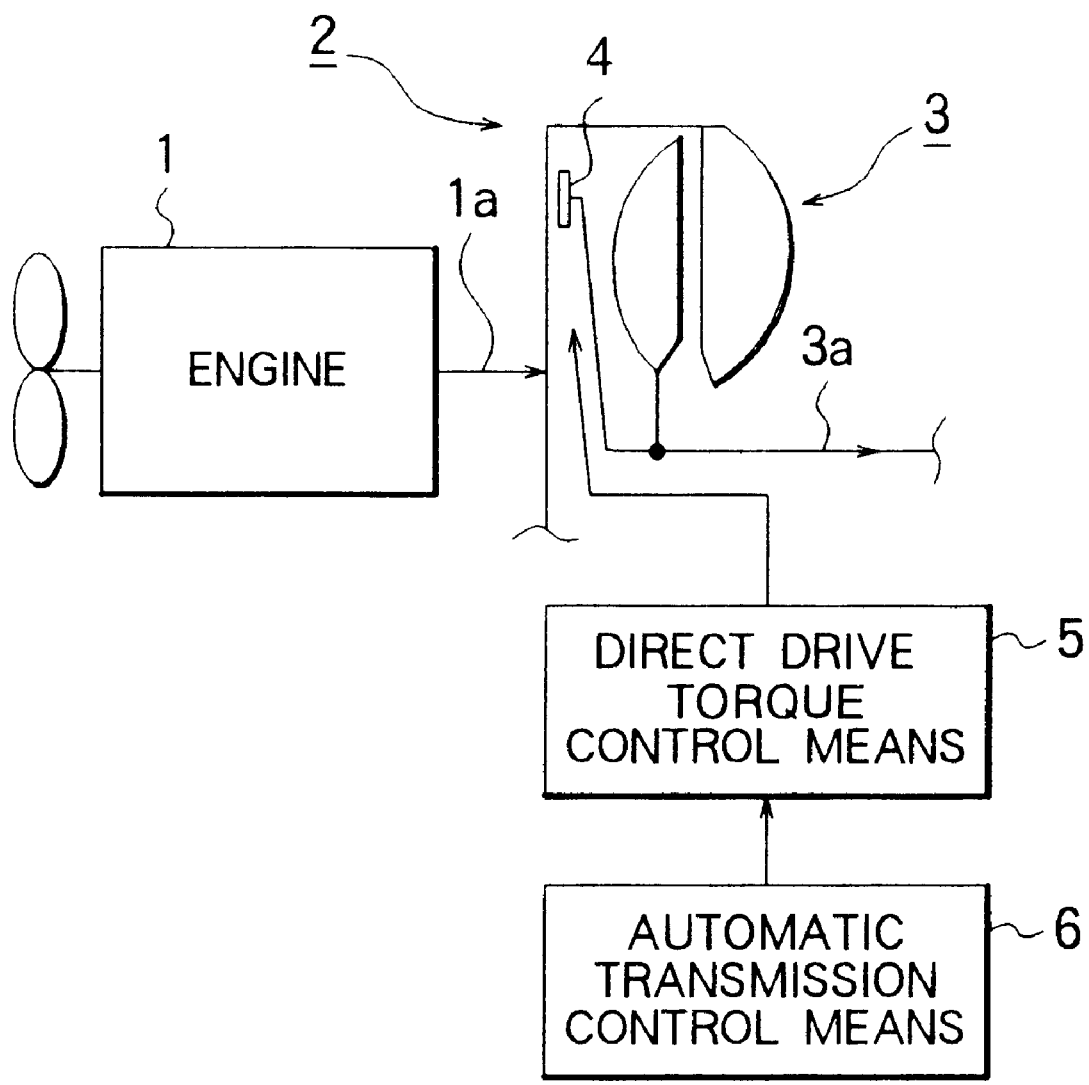
FIG. 5 is a diagram illustrating the constitution of a major portion of a conventional device for controlling an automatic transmission and an engine for automobiles.

FIG. 4 is a timing chart illustrating the operation at the time of acceleration according to the embodiment 2 of the present invention, wherein moments t1, t2, t4 to t6 and margin time tm represent timings and times same as those mentioned above (see FIG. 2).

In this case, the throttle valve control means 12 (see FIG. 1) causes the throttle valve opening degree T to change following the amount of change in the accelerator pedal opening degree A while limiting the rate of change in the throttle valve opening degree T to be not larger than a predetermined value αt.

The predetermined value αt for limiting a rate of change in the throttle valve opening degree T that follows the accelerator pedal opening degree A, is set to a value smaller than the above-mentioned predetermined value α for limiting the rate of change that follows the accelerator pedal opening degree A being delayed by the time td. Like the one mentioned above, furthermore, the predetermined value αt is variably set depending upon the operation conditions of the vehicle at a time (moment t2) when a transient operation condition is detected.

In the operation condition of a low engine running speed Ne, for example, the predetermined value αt for limiting a rate of change in the throttle valve opening degree T is set to a value smaller than a value in the operation condition of a high engine running speed Ne.

In FIG. 4, the direct drive control duty D is set to 0% at a moment t2 when a quick increase (acceleration) of the accelerator pedal opening degree A is detected, and the throttle valve opening degree T is permitted to gradually increase with its change being limited to the predetermined value αt.

During the operation for resetting the directly coupled state of the direct drive mechanism 4, therefore, the engine running speed Ne gradually increases and the turbine running speed Nt increases following the engine running speed Ne.

Hereinafter in the same manner as described above, the direct drive control duty D is gradually increased toward 100% (directly coupled state) from a moment t4 when the stable condition of the throttle valve opening degree T is detected to a moment t5 after a margin time tm has passed.

Thus, the operation for returning to the directly coupled state is completed at a moment t6 and the turbine running speed Nt comes into agreement with the engine running speed Ne.

Here, though not specifically diagramed to avoid duplication of description, the operation at the time of deceleration is the same as the above-mentioned operation (see FIG. 3) with the exception of timings of change and the amounts of change in the throttle valve opening degree T and the engine running speed Ne (turbine running speed Nt).

After the accelerator pedal 7 is depressed or released as described above, the directly coupled state of the direct drive mechanism 4 is reset and, then, the output torque of the engine 1 is gradually increased or decreased at a rate not larger than the predetermined value αt, in order to reduce the shock at the time of acceleration or deceleration.

At the time of acceleration, furthermore, the directly coupled state is reset (non-directly coupled state is established) in the initial stage of acceleration, making it possible to utilize the effect for amplifying the torque of the torque converter 3 and to accomplish good acceleration.

During the acceleration or deceleration after the directly coupled state is reset, furthermore, the direct drive mechanism 4 is permitted to return to the directly coupled state after it is confirmed that the throttle valve opening degree T is stabilized. It is therefore made possible to suppress the time region of non-directly coupled state to a minimum required limit during the acceleration or deceleration to accomplish favorable fuel efficiency again.

When returning to the directly coupled state, the direct drive control duty D is gradually shifted toward 100% in order to reliably decrease the shock that occurs at the time of being changed over to the directly coupled state.

Furthermore, the predetermined value α for limiting a rate of change in the throttle valve opening degree T is variably set relying upon the operation conditions of the vehicle at a moment when a transient operation condition is detected. Therefore, the control timings of the direct drive mechanism 4 and of the throttle actuator 10 are optimized at all times irrespective of the operation conditions.

Embodiment 3

In the above-mentioned embodiments 1 and 2, the operation for returning to the directly coupled state was started after the passage of a margin time tm from the moment t4 (or t14) when the stable state of the throttle valve opening degree T was detected. It is, however, also allowable to effect the operation for returning to the directly coupled state starting from the moment t4 (or t14) at which the stable state of the throttle valve opening degree T is detected.

Embodiment 4

In the above-mentioned embodiments 1 and 2, a rate of change in the direct drive control duty D was limited and was caused to pass through the slip-coupled state when returning to the directly coupled state. However, the direct drive control duty D may be readily set to 100%.

Embodiment 5.

In the above-mentioned embodiments 1 and 2, furthermore, a variety of parameters for determining the control timings were variably set depending upon the operation conditions. However, these parameters may be fixed provided the shock can be suppressed to a sufficient degree during the transient condition.

We claim:

1. A device for controlling an automatic transmission and an engine for vehicles, comprising:

an engine mounted on a vehicle;

a torque converter for transmitting the output torque of said engine to a side of wheels via a fluid;

a direct drive mechanism for directly coupling an output shaft of said torque converter to an output shaft of said engine;

an automatic transmission including said torque converter and said direct drive mechanism;

an automatic transmission control means for controlling said automatic transmission;

an accelerator pedal operated by a driver of said vehicle;

an accelerator pedal opening-degree sensor for detecting the amount of depression of said accelerator pedal as an accelerator pedal opening degree;

a throttle valve for adjusting the amount of the air intaken by said engine;

a throttle actuator for opening and closing said throttle valve; and a throttle valve control means for controlling the throttle valve opening degree by driving said throttle actuator; wherein said automatic transmission control means resets the directly coupled state of said direct drive mechanism when the accelerator pedal opening degree has changed by more than a predetermined amount that corresponds to a transient operation condition; and said throttle valve control means delays the operation for opening said throttle valve following the accelerator pedal opening degree when said accelerator pedal opening degree has changed by more than said predetermined amount.

2. A device for controlling an automatic transmission and an engine for vehicles according to claim 1, wherein said throttle valve control means changes the throttle valve opening degree in response to an amount of change in said accelerator pedal opening degree after the passage of a predetermined delay time that corresponds to the operation time of said direct drive mechanism.

3. A device for controlling an automatic transmission and an engine for vehicles according to claim 2, wherein said throttle valve control means limits a rate of change in the throttle valve opening degree to be smaller than a predetermined value.

4. A device for controlling an automatic transmission and an engine for vehicles according to claim 3, wherein said predetermined amount corresponding to the change in the accelerator pedal opening degree in said transient operation condition, said delay time for opening said throttle valve following the accelerator pedal opening degree, and said predetermined value for limiting the rate of change in the throttle valve opening degree, are variably set depending upon the operation conditions of said vehicle at a moment when said transient operation condition is detected.

5. A device for controlling an automatic transmission and an engine for vehicles according to claim 1, wherein said throttle valve control means changes said throttle valve opening degree in response to the amount of change in said accelerator pedal opening degree while limiting the rate of change in said throttle valve opening degree to be smaller than a predetermined value.

6. A device for controlling an automatic transmission and an engine for vehicles according to claim 5, wherein said predetermined value for limiting the rate of change in the throttle valve opening degree following the accelerator pedal opening degree, is variably set depending upon the operation conditions of said vehicle at a moment when said transient operation condition is detected.

7. A device for controlling an automatic transmission and an engine for vehicles according to claim 1, wherein said automatic transmission control means permits said direct drive mechanism to return to the directly coupled state at a moment when the amount of change in the throttle valve opening degree has become smaller than a permissible amount.

8. A device for controlling an automatic transmission and an engine for vehicles according to claim 7, wherein said automatic transmission control means permits said direct drive mechanism to return to the directly coupled state after the passage of a predetermined margin time from when the amount of change in the throttle valve opening degree has become smaller than the permissible amount.

9. A device for controlling an automatic transmission and an engine for vehicles according to claim 8, wherein the permissible amount of change in the throttle valve opening degree for returning to said directly coupled state and said predetermined margin time, are variably set depending upon the operation conditions of said vehicle at a moment when said directly coupled state is resumed.

10. A device for controlling an automatic transmission and an engine for vehicles according to claim 7, wherein said automatic transmission control means permits said direct drive mechanism to return to the directly coupled state through a slip-coupled state.

* * * * *